(12) United States Patent  
Yamamoto et al.

(10) Patent No.: US 10,612,904 B2  
(45) Date of Patent: Apr. 7, 2020

(54) COORDINATE MEASURING MACHINE AND COORDINATE MEASURING METHOD

(71) Applicant: MITUTOYO CORPORATION, Kawasaki-shi, Kanagawa (JP)

(72) Inventors: Hidetaka Yamamoto, Kawasaki (JP); Kentaro Nemoto, Kawasaki (JP); Tadashi Iwamoto, Hino (JP)

(73) Assignee: MITUTOYO CORPORATION, Kawasaki-Shi (JP)

( * ) Notice: Subject to any disclaimer, the term of this patent is extended or adjusted under 35 U.S.C. 154(b) by 92 days.

(21) Appl. No.: 15/970,275

(22) Filed: May 3, 2018

(65) Prior Publication Data
US 2018/0328706 A1 Nov. 15, 2018

(30) Foreign Application Priority Data
May 12, 2017 (JP) .................................. 2017-095562

(51) Int. Cl.
| | | |
|---|---|---|
| *G01B 5/008* | (2006.01) | |
| *G01B 11/00* | (2006.01) | |
| *G01B 5/00* | (2006.01) | |
| *G01B 3/20* | (2006.01) | |
| *G01B 5/20* | (2006.01) | |

(52) U.S. Cl.
CPC ............ *G01B 5/008* (2013.01); *G01B 3/20* (2013.01); *G01B 5/0004* (2013.01); *G01B 5/20* (2013.01); *G01B 11/005* (2013.01)

(58) Field of Classification Search
CPC ......... G01B 11/24; G01B 11/03; G01B 11/25; G01B 21/042; G01B 5/012; G01B 11/026; G01B 11/2433; G01B 11/2518; G01B 3/008; G01B 3/30; G01L 33/30
USPC .......................................................... 33/503
See application file for complete search history.

(56) References Cited

U.S. PATENT DOCUMENTS

| | | | |
|---|---|---|---|
| 8,961,537 B2 * | 2/2015 | Leung .................... B25J 9/1689 | 606/130 |
| 9,625,581 B2 * | 4/2017 | Chang .................... B29C 64/20 | |
| 10,314,555 B1 * | 6/2019 | Woods .................... A61B 6/44 | |
| 10,333,632 B2 * | 6/2019 | Vikstedt ............. G01R 29/0814 | |

FOREIGN PATENT DOCUMENTS

| | | |
|---|---|---|
| JP | 2008-209420 | 9/2008 |
| JP | 2011-107058 | 6/2011 |

* cited by examiner

*Primary Examiner* — Yaritza Guadalupe-McCall  
(74) *Attorney, Agent, or Firm* — Rankin, Hill & Clark LLP (57) ABSTRACT

A coordinate measuring machine includes a mount for a workpiece, an arched frame straddling the mount, a slider movable along the frame, and a probe supported by the slider and pointed at the mount. A rotor enables the mount and the frame to relatively rotate. An XY-motion mechanism enables the mount to move in a direction along a surface of the mount.

5 Claims, 11 Drawing Sheets

COORDINATE MEASURING MACHINE AND COORDINATE MEASURING METHOD

The entire disclosure of Japanese Patent Application No. 2017-095562 filed May 12, 2017 is expressly incorporated by reference herein.

TECHNICAL FIELD

The present invention relates to a coordinate measuring machine and a coordinate measuring method.

BACKGROUND ART

A coordinate measuring machine is used to measure a three-dimensional profile of a workpiece.

The coordinate measuring machine may include a mount for a workpiece, a touch probe being brought into contact with a surface of a workpiece, and a relative motion mechanism enabling a relative motion of the mount and the probe in three axial directions such as X-axis, Y-axis and Z-axis directions (see Patent Literature 1: JP 2011-107058 A).

The relative motion mechanism may include a portal frame movable in the Y-axis direction with respect to the mount, a slider movable in the X-axis direction along a horizontal beam of the portal frame, and an elevating head movable in the Z-axis direction with respect to the slider, the probe being attached to the elevating head.

The coordinate measuring machine may use, instead of the above-described contact probe, a non-contact laser probe capable of non-contact measurement of a workpiece with a laser beam (Patent Literature 2: JP 2008-209420 A).

In this case, the coordinate measuring machine is preprogrammed to perform a predetermined measurement operation on a workpiece so that the measurement operation is automatically performed with an improved operating efficiency.

A typical coordinate measuring machine sometimes requires an additional operation for changing the attachment state of the probe depending on a profile or a portion being measured of the workpiece.

For instance, a posture of the probe needs to be changed to measure a less visible portion or the inside of a hole.

Such a change in the posture of the probe necessitates alignment (i.e., qualification) of the coordinate measuring machine and the probe in the changed posture, reducing the operating efficiency.

To prevent a reduction in the operating efficiency accompanying a change in the posture of the probe, a measurement process is reexamined depending on the profile of a workpiece in preparation for measurement. Specifically, an optimal measurement process capable of minimizing the frequency of changing the posture of the probe is determined and programmed in the form of a macro to perform the measurement process.

However, these complicated works, such as reexamining the measurement process and creating the macro, are required for each of workpieces with different profiles, so that the operating efficiency in the profile measurement of a workpiece as a whole still needs to be improved.

SUMMARY OF THE INVENTION

An object of the invention is to provide a coordinate measuring machine that eliminates the necessity of preprogramming a measurement operation, the coordinate measuring machine being more user-friendly and allowing even an unskilled operator to easily perform measurement simply by pressing a button, and provide, in order to achieve the above, a coordinate measuring method that eliminates the necessity of changing a posture of a probe in measurement.

According to an aspect of the invention, a coordinate measuring machine includes: a mount for a workpiece to be mounted; an arched frame straddling the mount; a slider movable along the frame; and a probe supported by the slider and pointed at the mount.

In the above aspect, the frame and the mount can be supported on the same base. The mount usually keeps its surface level. A datum plane of the arched frame (an imaginary plane including the arc and the center of curvature thereof) may be set vertical or slant. The frame may be fixed at both ends or, alternatively, only at one end.

In the above aspect, the probe is moved along the frame with the motion of the slider along the frame. The arched frame allows the probe to be always pointed at the mount inside the frame (a range around the center of curvature) as being moved.

In an exemplary instance, when the probe is at an end of the frame, the probe is pointed at a side surface of the workpiece on the mount. As the probe is moved along the frame, the probe changes its posture along the arch shape of the frame, facing an upper surface of the workpiece and, then, the opposite side surface of the workpiece.

The coordinate measuring machine of the above aspect thus allows the operator to detect different surfaces of the workpiece without the necessity of changing the posture of the probe.

In the above aspect, it is preferable that the mount and the frame are rotatable relative to each other.

In the above aspect, when, for instance, the mount and the frame are supported on the same base, the mount may be fixed to the base while the frame is rotatable. Alternatively, the fame may be fixed to the base while the mount is rotatable.

The rotation axis of the frame or the base may be aligned with a vertical direction (Z-axis direction). Alternatively, the rotation axis may be aligned with a direction along the arch shape of the frame (e.g., an axis passing through the top and the center of curvature of the arch).

In the above aspect, the entire surface of the workpiece can be detected by repeating a detection operation around the workpiece using the probe being moved along the frame to obtain the detection results of the workpiece (from one side surface to the opposite side surface).

In the above aspect, it is preferable that the mount is movable in a direction along a surface of the mount.

In the above aspect, the direction along the surface of the mount is usually a horizontal direction and preferably at least one of the X-axis direction and the Y-axis direction.

In the above aspect, if the workpiece on the mount has a part lying outside a detectable range for the probe being moved along the frame, the part can be let in the detectable range for the probe by moving the workpiece using the mount.

In the above aspect, it is preferable that the probe is a non-contact probe configured to detect a surface of the workpiece without contact.

In the above aspect, the non-contact probe may be an optical probe and, especially, a laser-scanning probe capable of emitting a laser beam in a sweeping manner is preferable.

The probe of the above aspect, which is configured to detect the surface of the workpiece without contact, can reliably detect the surface of the workpiece as being moved along the frame.

According to another aspect of the invention, a coordinate measuring method being implemented using the coordinate measuring machine includes: detecting the surface of the workpiece from all detectable directions for the coordinate measuring machine; and selecting desired data from all detection data later.

In the above aspect, detection operations of the coordinate measuring machine from all the detectable directions are preprogramed. Specifically, a data pitch and a measurement pitch for the detection operations are determined in advance. This program is run to detect the surface of the workpiece. After the completion of all the detection operations, the desired detection data can be obtained by selecting the detection data with reference to necessary detecting direction(s) or detected portion(s).

The coordinate measuring machine of the above aspect eliminates the necessity of changing the posture of the probe as described above, so that the detection operations from all the directions can be collectively performed.

The coordinate measuring machine of the above aspect first detects all the data and selects desired data from the detection data later, so that the same program (depending on the configuration of the coordinate measuring machine) is always usable.

This eliminates the necessity of preprogramming the measurement operation, allowing even a person unskilled in programming to perform the profile measurement using the coordinate measuring machine.

According to the above aspects of the invention, a coordinate measuring machine eliminating the necessity of changing a posture of a probe can be provided. Further, a coordinate measuring method eliminating the necessity of preprogramming a measurement operation can be provided.

DESCRIPTION OF EMBODIMENT(S)

First Exemplary Embodiment

FIGS. 1 to 10 show a first exemplary embodiment of the invention.

Figure 1:
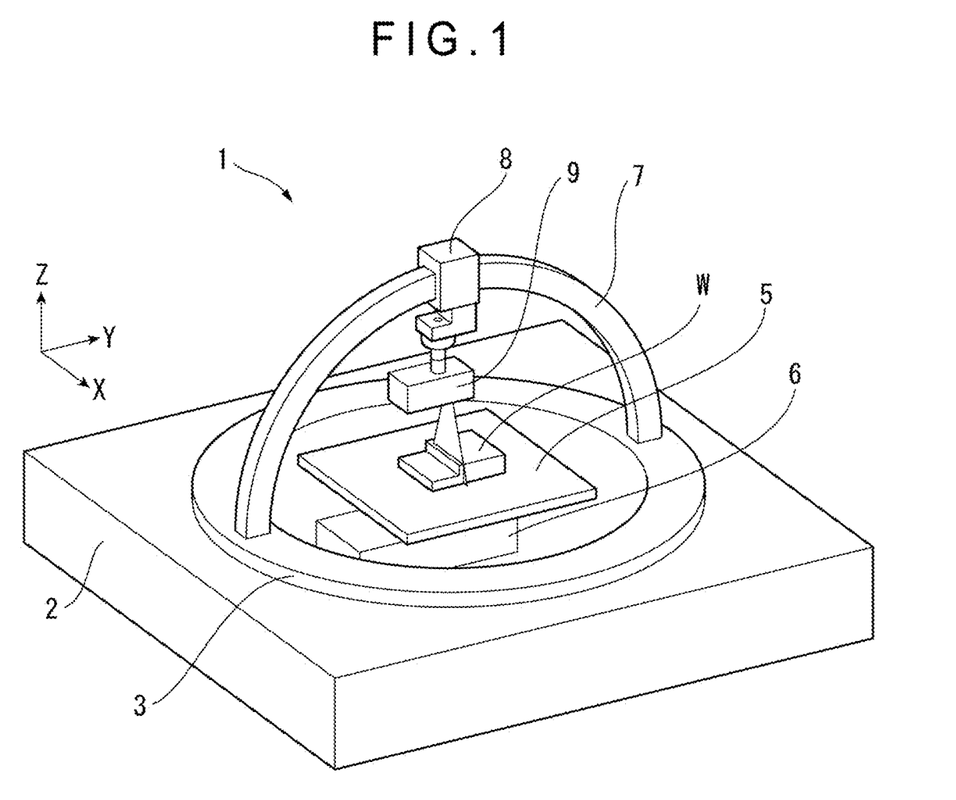
FIG. 1 is a perspective view showing a first exemplary embodiment of the invention.

Referring to FIG. 1, a coordinate measuring machine 1 includes a base 2 with an upper surface provided with a cylindrical rotor 3. The rotor 3 is supported to be rotatable around a center axis aligned with a vertical Z-axis direction so that the rotor 3 is rotated by, for instance, a drive mechanism (not shown) to a predetermined rotary angle position.

A mount 5 for a workpiece W is set inside the rotor 3.

The mount 5 is supported by an XY-motion mechanism 6 and the XY-motion mechanism 6 is supported by the base 2 through an opening of a bottom surface of the rotor 3. The XY-motion mechanism 6 enables the mount 5 to move in the horizontal X-axis direction and Y-axis direction and, further, in a direction determined by a combination of the X-axis and Y-axis.

An arched frame 7 is disposed above the rotor 3 to straddle the mount 5. The frame 7 is provided with a slider 8 movable along the frame 7. The slider 8 is provided with a drive mechanism (not shown) so that the slider 8 is moved to a desired position on the frame 7.

A non-contact probe 9 capable of laser scanning is supported on the slider 8.

The probe 9, which is pointed at the workpiece W on the mount 5, is movable to a position on the frame 7 with the motion of the slider 8.

Figure 2:
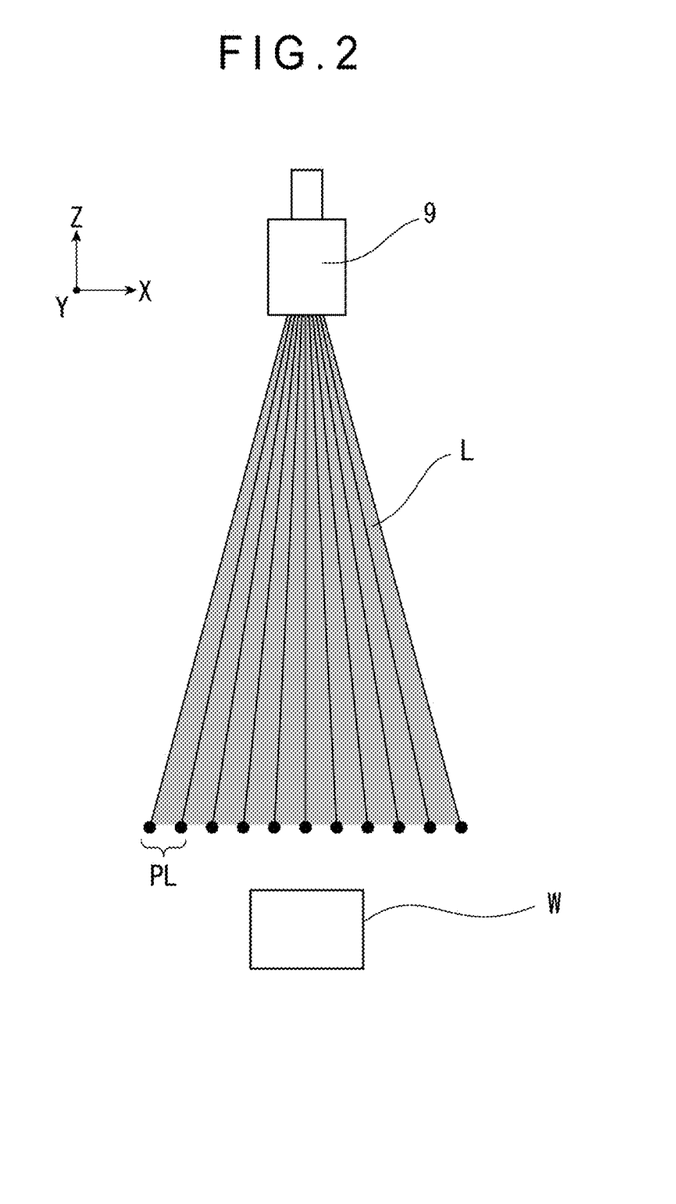
FIG. 2 schematically shows a laser-scanning probe according to the first exemplary embodiment.

Referring to FIG. 2, the probe 9 is configured to emit a laser beam L in a sweeping manner over a predetermined width at a predetermined scanning pitch PL. Further, the probe 9 is configured to detect a reflected light from the workpiece W to measure a profile of the workpiece W.

For instance, when the frame 7 extends in the Y-axis direction as shown in FIG. 1, the laser beam L is spread in the X-axis direction, enabling measurement of a profile of the workpiece W in the X-axis direction. When the frame 7 is rotated with the rotation of the rotor 3 to extend in the X-axis direction, the laser beam L is spread in the Y-axis direction, enabling measurement of a profile of the workpiece W in the Y-axis direction.

It should be noted that the scanning pitch PL means an interval (data pitch) determined such that linear laser beams applied to the workpiece W are partly detected as a reflected light (point data). The laser beam L may be in the form of a line of spots of light emitted in a sweeping manner over a predetermined width or in the form of a linear laser beam as emitted.

Figure 3:
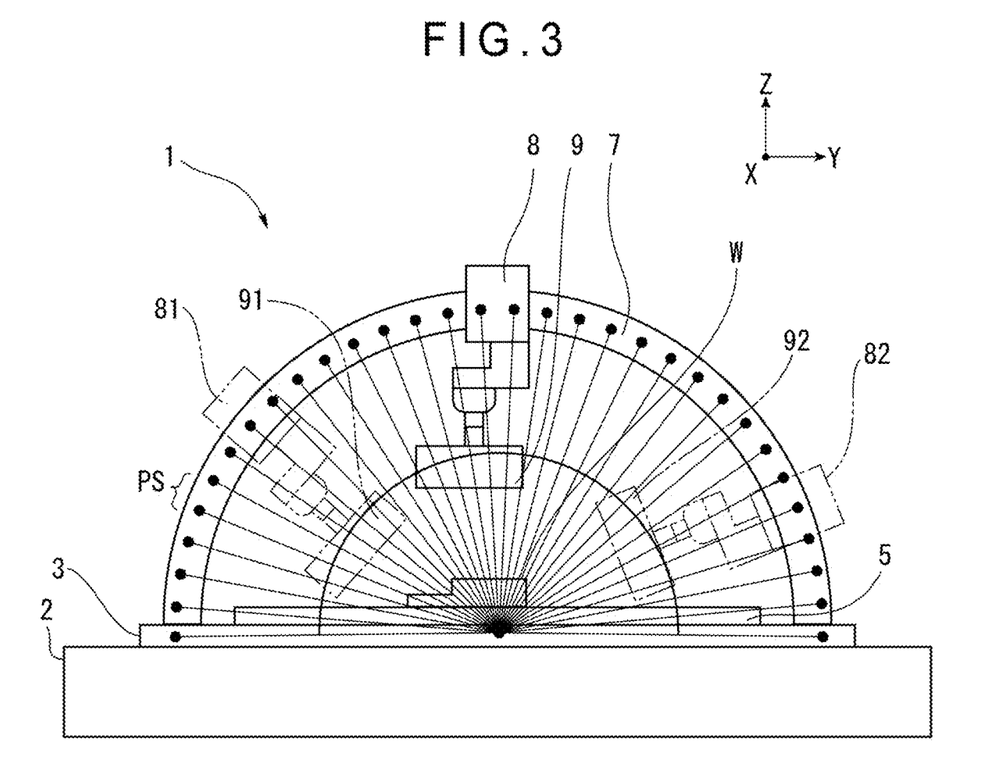
FIG. 3 is a side view showing a measurement operation according to the first exemplary embodiment.

As shown in FIG. 3, as the probe 9 is moved to a predetermined position on the frame 7 by the slider 8, a profile of a surface of the workpiece W corresponding to a semiperimeter along an extending direction of the frame 7 can be measured, the profile being occasionally referred to as "semiperimetric profile" hereinafter. Specifically, when the frame 7 extends in the Y-axis direction, a profile corresponding to the semiperimeter across the workpiece W in the Y-axis direction can be measured.

The profile measurement with the motion of the probe 9 along the frame 7 is performed at a predetermined motion pitch PS.

It should be noted that points at the motion pitch PS shown in FIG. 3 each represent a timing of receiving the reflected light as data while the slider 8 is continuously moved along the frame 7. The slider 8 is continuously moved along the frame 7, passing through each point where the reflected light is received as data, instead of intermittently being moved along the frame 7 and stopped at each point.

As described above, the probe 9 is moved along the frame 7 to measure the semiperimetric profile of the workpiece W. It should be noted that an actual measurable range is smaller than the semiperimeter due to interference of the probe 9 with the mount 5 or the workpiece W.

For instance, referring to FIG. 3, probe 91 and slider 81 show a first limit of motion, and probe 92 and slider 82 show a second limit of motion.

Figure 4:
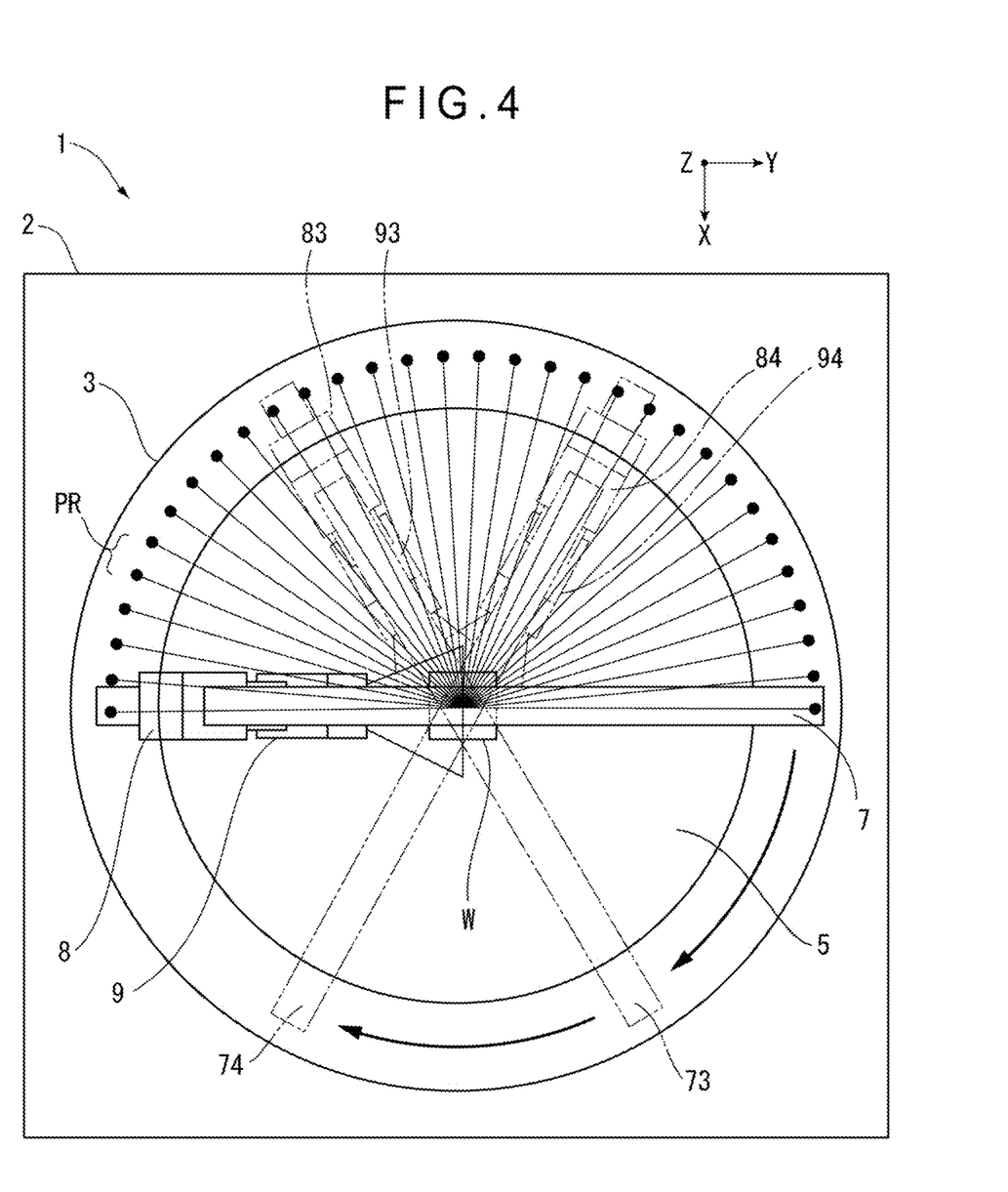
FIG. 4 is a plan view showing a circumferential motion according to the first exemplary embodiment.

As shown in FIG. 4, the extending direction of the frame 7 can be aligned with the X-axis direction, the Y-axis direction or a predetermined angle position between these directions by rotating the rotor 3. The direction of motion of the probe 9 along the frame 7, i.e., the direction of measurement of the semiperimetric profile with the above-described motion of the probe 9 along the frame 7, can thus be determined as desired.

The direction of the frame 7, i.e., the direction of measurement of the semiperimetric profile, determined by rotating the rotor 3 can be selected on a basis of a predetermined rotation pitch PR.

For instance, referring to FIG. 4, when the frame 7 extends in the Y-axis direction, the slider 8 and the probe 9 are accordingly moved in the Y-axis direction. A rotation of the frame 7 by a desired angle with the rotor 3 causes a motion of slider 83 and probe 93 along a frame 73 or a motion of slider 84 and probe 94 along a frame 74.

As described above, in the first exemplary embodiment, the XY-motion mechanism 6 enables the mount 5 for the workpiece W to move in the horizontal X-axis direction and Y-axis direction.

Accordingly, in measuring the semiperimetric profile by moving the probe 9 along the frame 7, the workpiece W and the mount 5 can be moved in the extending direction of the frame 7 to increase a detectable range for the probe 9 to detect the workpiece W during the profile measurement.

Figure 5:
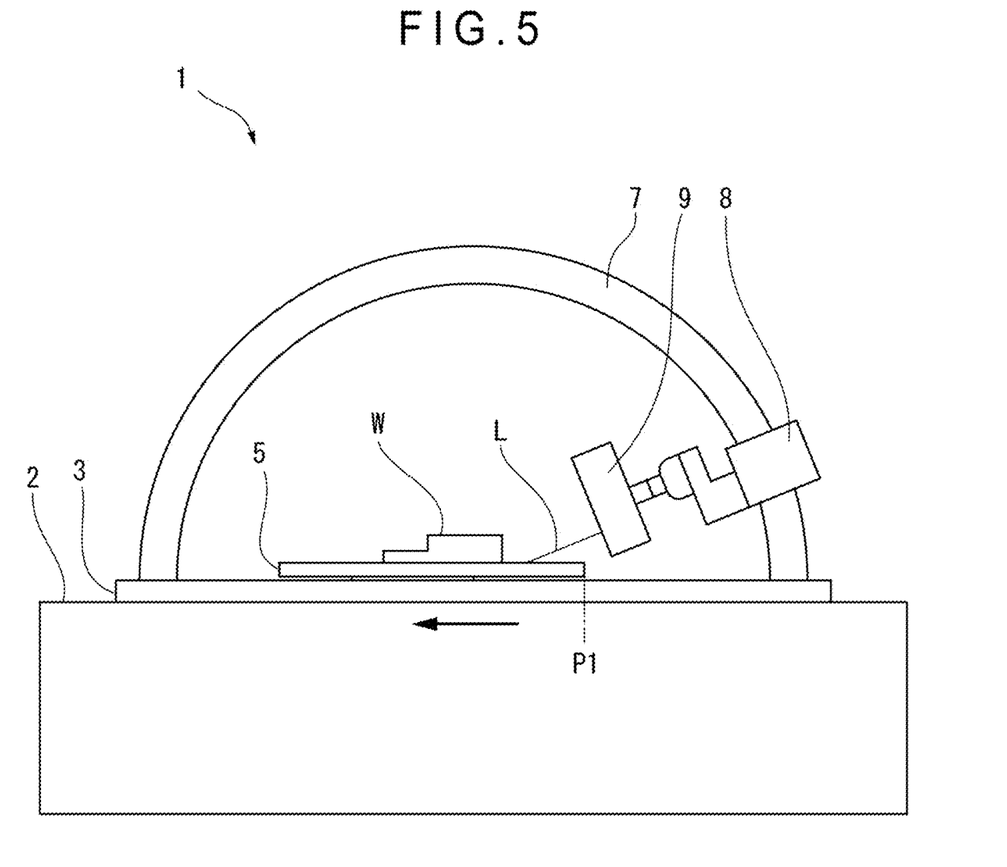
FIG. 5 is a side view showing a start of a forward motion for the measurement operation according to the first exemplary embodiment.
Figure 6:
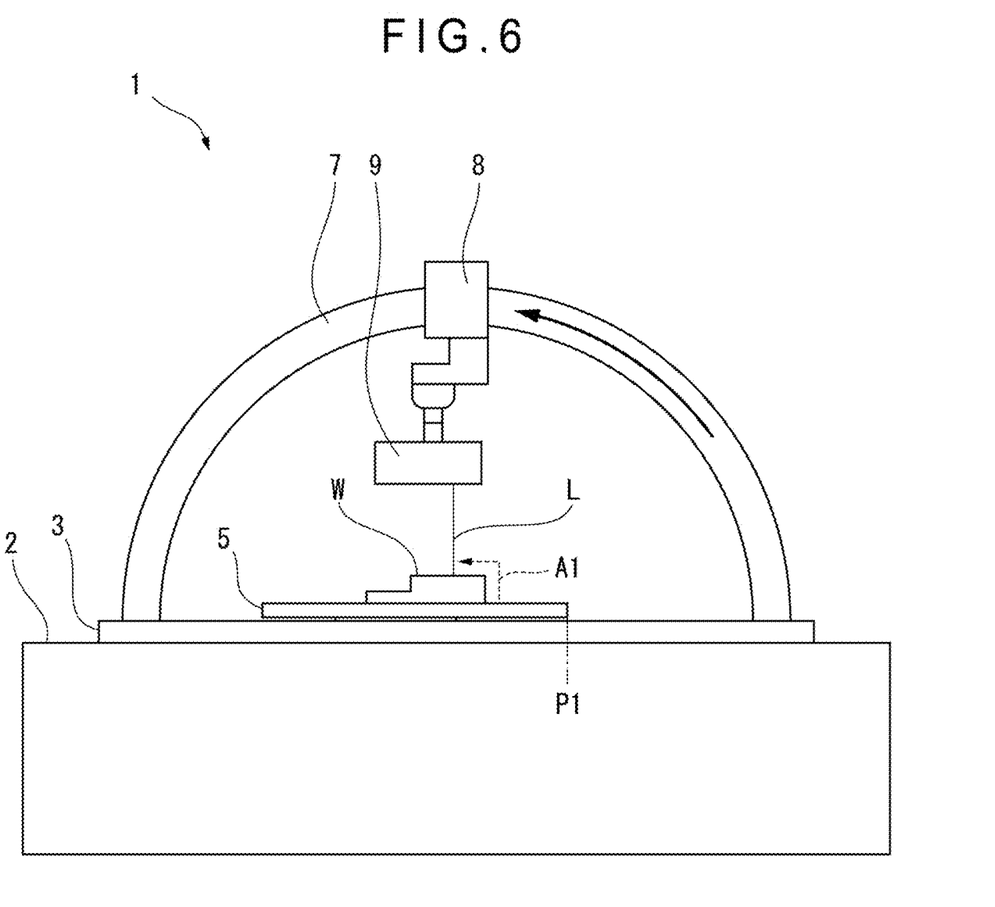
FIG. 6 is a side view showing a middle of the forward motion for the measurement operation according to the first exemplary embodiment.
Figure 7:
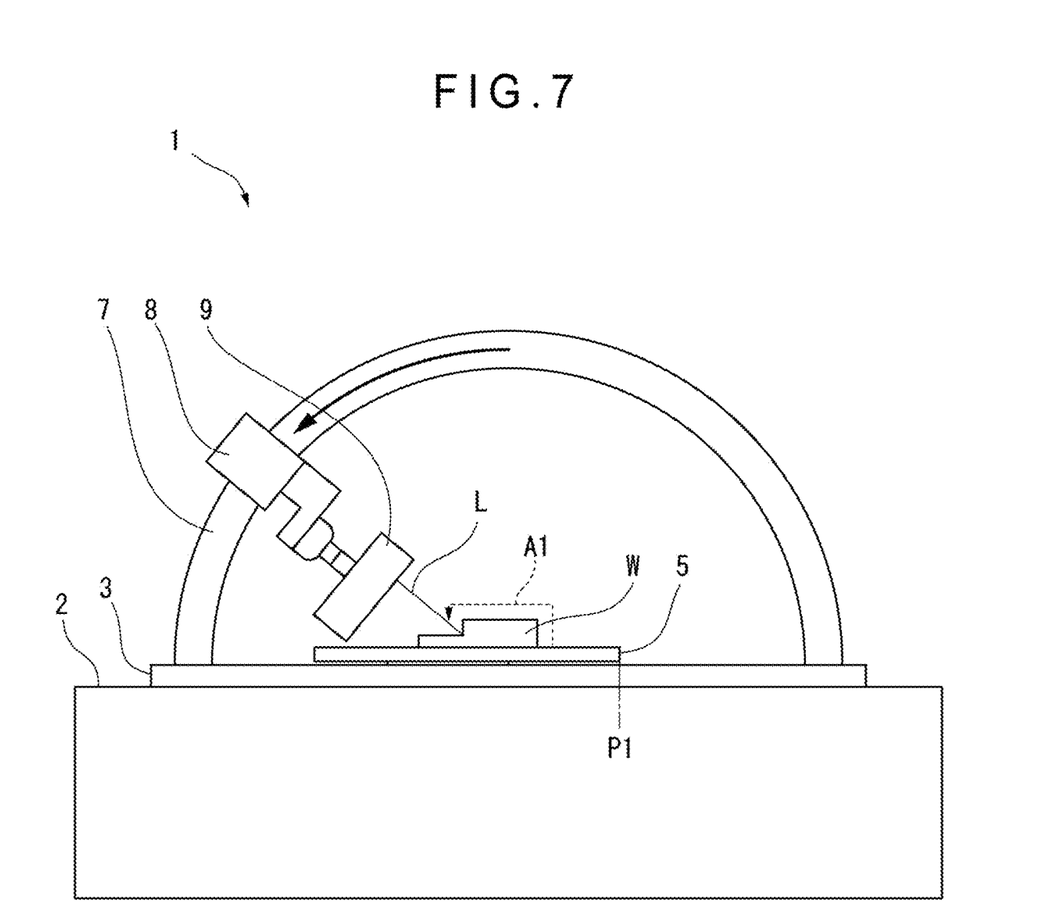
FIG. 7 is a side view showing an end of the forward motion for the measurement operation according to the first exemplary embodiment.

For instance, as shown in FIGS. 5 to 7, the mount 5 is set at a first position P1 and a semiperimetric profile is being measured by moving the probe 9 along the frame 7.

Referring to FIG. 5, the probe 9 is moved to a first end of the frame 7, where the probe 9 emits the laser beam L and starts scanning the workpiece W.

As shown in FIG. 6, an area A1 in a surface of the workpiece W is being measured with the laser beam L as the probe 9 is slowly moved along the frame 7.

As shown in FIG. 7, when the probe 9 reaches a neighborhood of a second end of the frame 7 opposite to the first end, the measurement of the semiperimetric profile of the workpiece W with the laser beam L is ended.

It should be noted that the area A1 measured with the laser beam L does not reach an end of the workpiece W, since the probe 9 has to be stopped before reaching the second end of the frame 7 to avoid interference with the mount 5.

Figure 8:
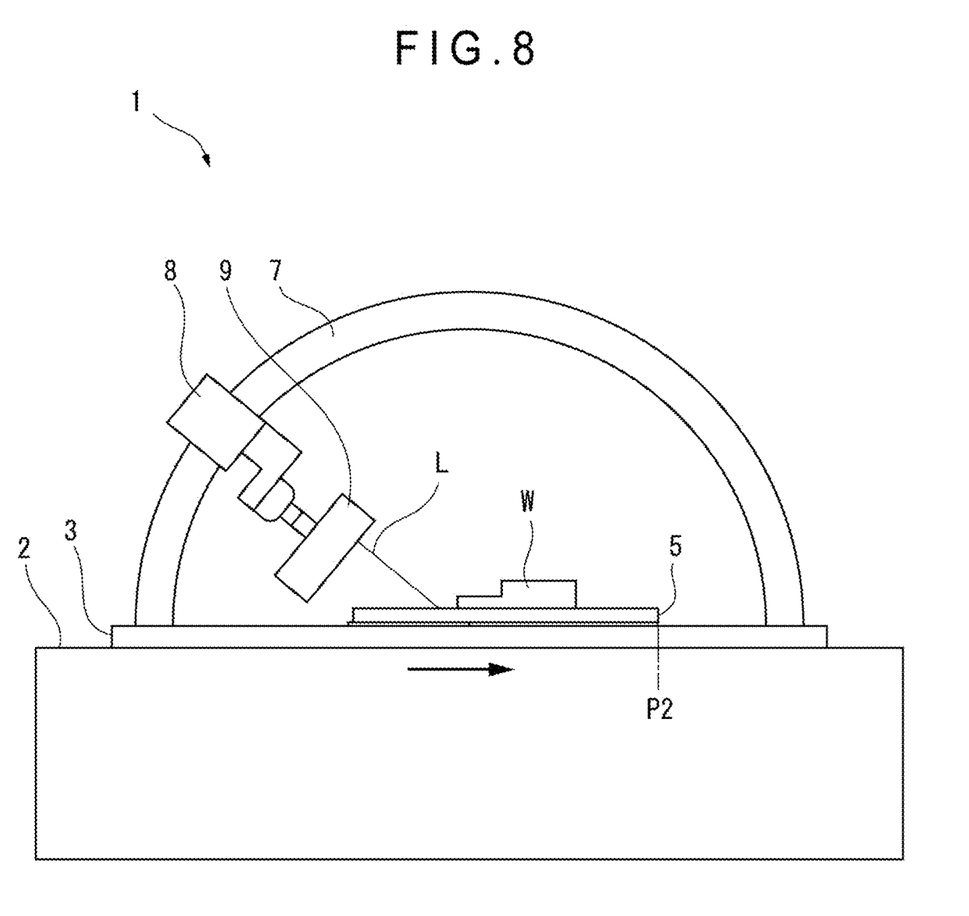
FIG. 8 is a side view showing a start of a backward motion for the measurement operation according to the first exemplary embodiment.
Figure 9:
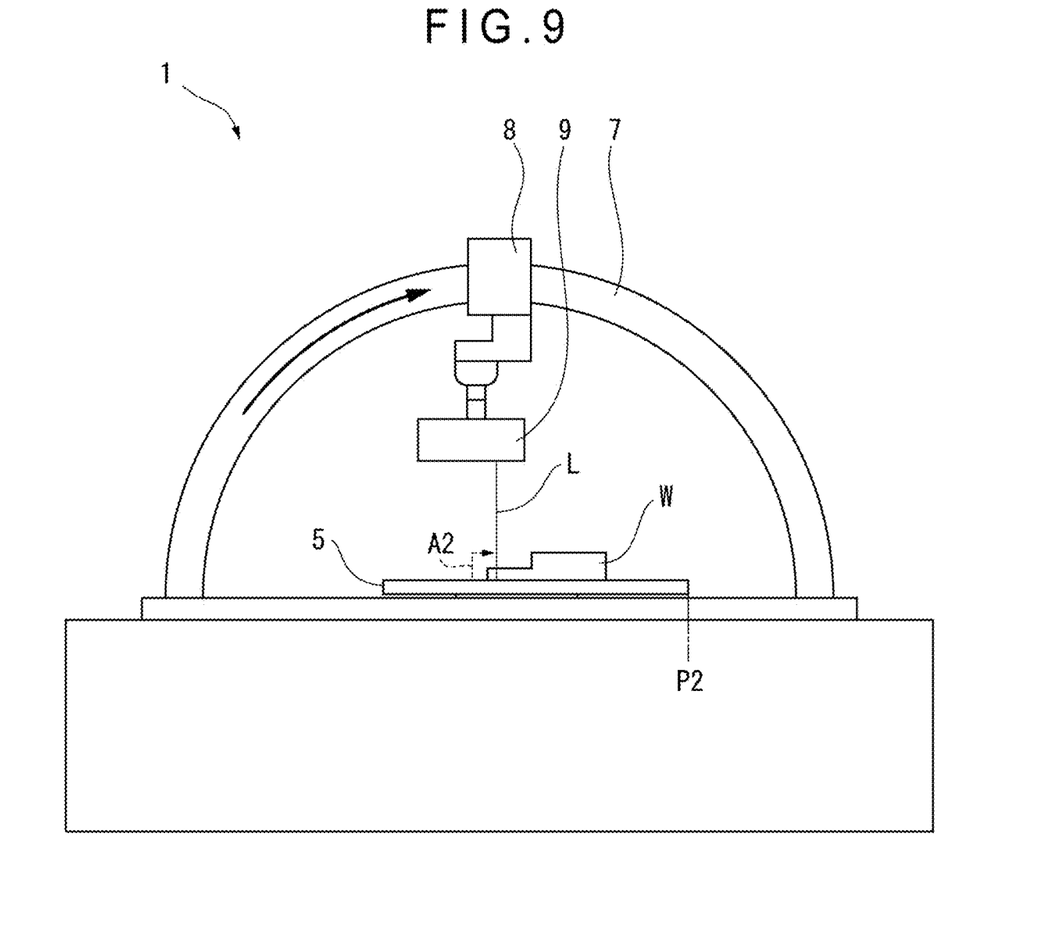
FIG. 9 is a side view showing a middle of the backward motion for the measurement operation according to the first exemplary embodiment.
Figure 10:
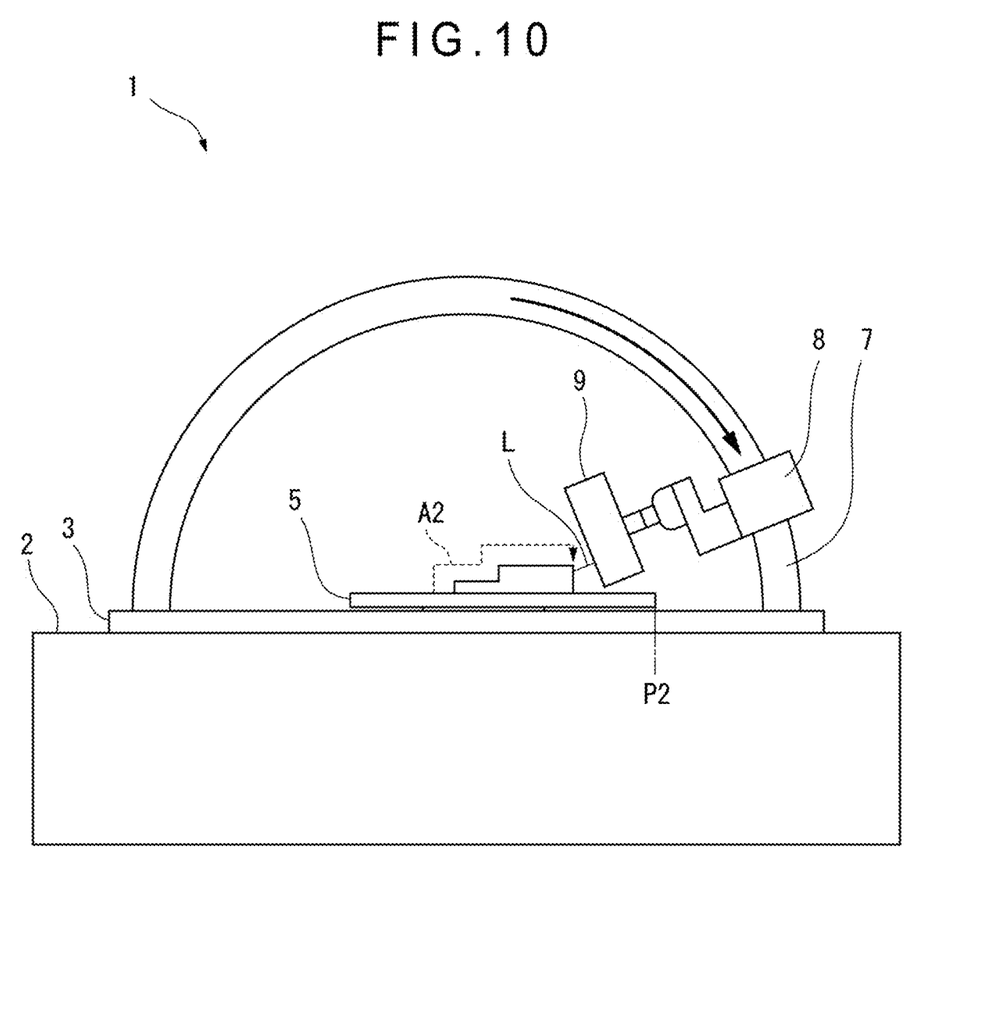
FIG. 10 is a side view showing an end of the backward motion for the measurement operation according to the first exemplary embodiment.

Subsequently, as shown in FIGS. 8 to 10, the mount 5 is moved to a second position P2 and a semiperimetric profile is being measured by moving the probe 9 along the frame 7.

Referring to FIG. 8, at the second end of the frame 7 (the position where the probe 9 reaches in FIG. 7), the probe 9 emits the laser beam L and starts scanning the workpiece W.

As shown in FIG. 9, an area A2 in the surface of the workpiece W is being measured with the laser beam L as the probe 9 is slowly moved along the frame 7.

As shown in FIG. 10, when the probe 9 reaches a neighborhood of the first end of the frame 7 (the initial position in FIG. 5), the measurement of the semiperimetric profile of the workpiece W with the laser beam L is ended.

It should be noted that the area A2 measured with the laser beam L does not reach an end of the workpiece W, since the probe 9 has to be stopped before reaching the first end of the frame 7 to avoid interference with the mount 5.

By performing the profile measurement twice as described above, the semiperimetric profile (area A1) at the first position P1 and the semiperimetric profile (area A2) at the second position P2 are measured.

Although the profiles (area A1 and area A2) measured at the first and second positions are each partly missing, the entire semiperimetric profile of the workpiece W can be obtained by combining these profiles.

The coordinate measuring machine 1 of the first exemplary embodiment achieves the following advantages.

In the first exemplary embodiment, the probe 9 is moved along the frame 7 by moving the slider 8 along the frame 7. Since the frame 7 is arched, the moving probe 9 is always pointed at the mount 5 inside the frame 7 (a range around the center of curvature).

Specifically, when the probe 9 is at the first end of the frame 7 (see FIG. 5), the probe 9 is pointed at a side surface of the workpiece W on the mount 5. As the probe 9 is moved along the frame 7, the probe 9 changes its posture along the arch shape of the frame 7, facing an upper surface of the workpiece W (FIG. 6) and, then, the opposite side surface of the workpiece W (FIG. 7).

The coordinate measuring machine 1 of the first exemplary embodiment thus allows the operator to detect different surfaces of the workpiece W without the necessity of changing the posture of the probe 9.

In the first exemplary embodiment, the rotor 3 enables the frame 7 to rotate with respect to the mount 5.

The rotation of the rotor 3 as shown in FIG. 4 thus allows performing the profile measurement twice in a plurality of directions as shown in FIGS. 5 to 10, measuring the profile of the entire surface of the workpiece W.

In the first exemplary embodiment, the XY-motion mechanism 6 enables the mount 5 to move horizontally along a surface of the mount 5.

If the workpiece W on the mount 5 has a part lying outside the detectable range for the probe 9 being moved along the frame 7, the part can be let in the detectable range for the probe 9 by moving the workpiece W using the mount 5.

In the first exemplary embodiment, the probe 9 is a laser-scanning probe capable of scanning the workpiece W with the laser beam L. The probe 9 can thus reliably detect the surface of the workpiece W without contact as being moved along the frame 7.

In measuring the workpiece W using the coordinate measuring machine 1 of the first exemplary embodiment, the surface of the workpiece W is first detected using the coordinate measuring machine 1 from all the detectable directions for the coordinate measuring machine 1 and then desired data is selected from all the detection data.

Accordingly, in the first exemplary embodiment, detection operations of the coordinate measuring machine 1 from all the detectable directions are preprogramed. Specifically, a data pitch and a measurement pitch for the detection operations are determined in advance. This program is run to detect the surface of the workpiece W. After the completion of all the detection operations, the desired detection data can be obtained by selecting the detection data with reference to necessary detecting direction(s) or detected portion(s).

The coordinate measuring machine 1 of the first exemplary embodiment eliminates the necessity of changing the posture of the probe 9 as described above, so that the detection operations from all the directions can be collectively performed.

The coordinate measuring machine 1 of the first exemplary embodiment first detects all the data and selects desired data from the detection data later, so that the same program (depending on the configuration of the coordinate measuring machine 1) is always usable.

This eliminates the necessity of preprogramming a measurement operation, allowing a person unskilled in programming to perform a profile measurement using the coordinate measuring machine 1.

Second Exemplary Embodiment

Figure 11:
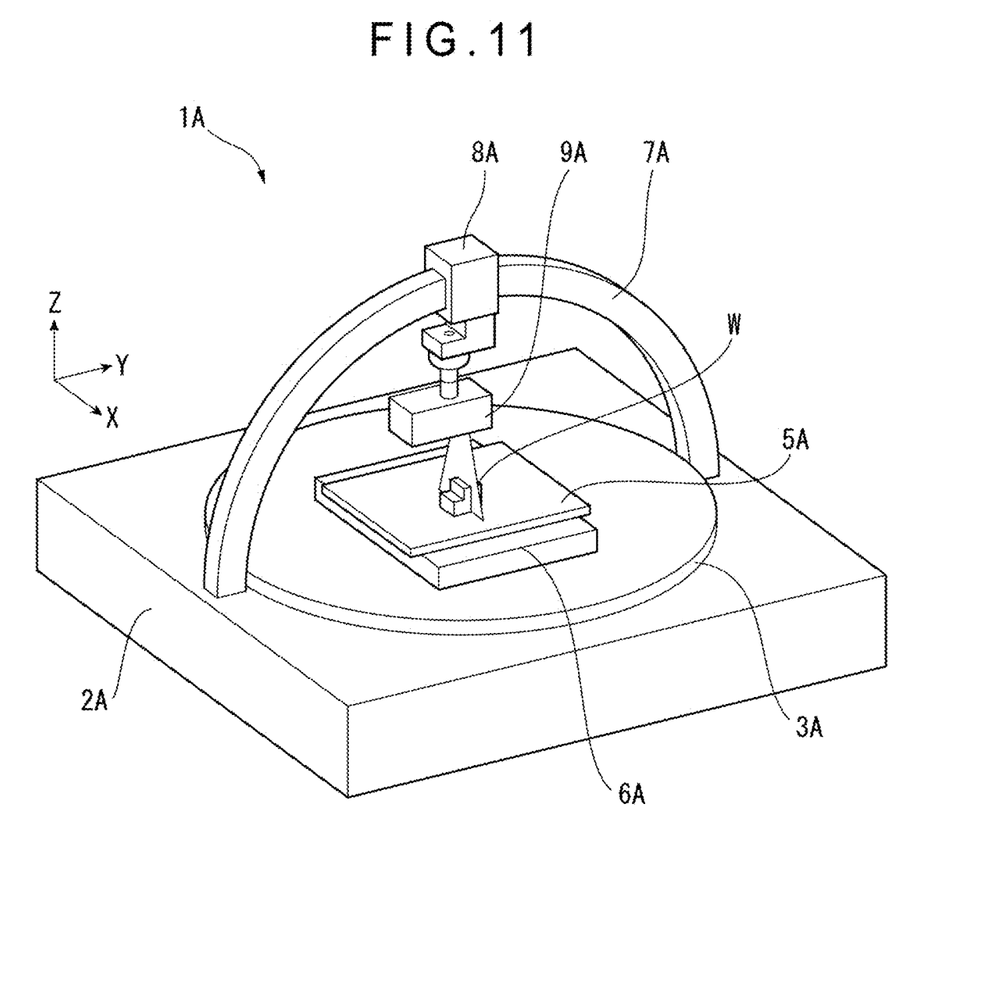
FIG. 11 is a perspective view showing a second exemplary embodiment of the invention.

FIG. 11 shows a second exemplary embodiment of the invention.

Referring to FIG. 11, a coordinate measuring machine 1A includes components similar to those of the first exemplary embodiment, such as a base 2A, a rotor 3A, a mount 5A, an XY-motion mechanism 6A, a frame 7A, a slider 8A, and a probe 9A.

However, in the second exemplary embodiment, the frame 7A is fixed to the base 2A, the disk-shaped rotor 3A is rotatably supported on the base 2A, and the mount 5A is supported on the rotor 3A via the XY-motion mechanism 6A.

In the second exemplary embodiment, the rotation of the rotor 3A causes the mount 5A and the XY-motion mechanism 6A to rotate with respect to the base 2A and the frame 7A. Further, the XY-motion mechanism 6A translates the mount 5A with respect to the base 2A and the frame 7A.

In the second exemplary embodiment, the above arrangement allows not only relative rotation between the mount 5A for the workpiece W and the frame 7A in the same manner as in the first exemplary embodiment, but also translation of the mount 5A with respect to the frame 7A.

Further, the slider 8A and the probe 9A are movable to a desired position along the frame 7A in the same manner as in the first exemplary embodiment.

Thus, the second exemplary embodiment can also allow for the above-described operation of the first exemplary embodiment, that is, the measurement path shown in FIGS. 3 and 4 and the measurement operation explained with reference to FIGS. 5 to 10.

Consequently, the second exemplary embodiment can achieve the same advantages as those of the first exemplary embodiment.

Other Exemplary Embodiment(s)

The invention is not limited to the exemplary embodiments but may include any modifications and the like not hampering the achievement of an object of the invention.

In the exemplary embodiments, the probes 9, 9A are each a non-contact probe capable of laser scanning, but may be an optical probe not using laser or, alternatively, be a contact probe.

In the exemplary embodiments, the XY-motion mechanisms 6, 6A respectively enable the mounts 5, 5A to move in the two horizontal axes intersecting each other. However, the mounts 5, 5A are each only required to move in one direction (the extending direction of the frames 7, 7A).

Further, if the measurable range of the probes 9, 9A is sufficiently wide, the motion of the mounts 5, 5A is not required.

What is claimed is:

1. A coordinate measuring machine comprising:
   a mount for a workpiece to be mounted;
   an arched frame straddling the mount;
   a slider movable along the frame; and
   a probe supported by the slider and pointed at the mount, wherein
   the probe is configured to scan the workpiece in a predetermined direction to measure a profile of the workpiece, and
   a scanning direction of the probe intersects the arched frame.

2. The coordinate measuring machine according to claim 1, wherein
   the mount and the frame are rotatable relative to each other.

3. The coordinate measuring machine according to claim 1, wherein
   the mount is movable in a direction along a surface of the mount.

4. The coordinate measuring machine according to claim 1, wherein
   the probe is a non-contact probe configured to detect a surface of the workpiece without contact.

5. A coordinate measuring method being implemented using the coordinate measuring machine according to claim 1, the method comprising:
   detecting the surface of the workpiece from all detectable directions for the coordinate measuring machine; and
   selecting desired data from all detection data later.

* * * * *